Feb. 2, 1960     E. J. BERNET     2,923,881
PORTABLE UNIFORMITY METER
Filed March 12, 1958     2 Sheets-Sheet 1

INVENTOR.
Edwin J. Bernet
BY
Pennie, Edmonds, Morton, Barrows & Taylor
ATTORNEYS

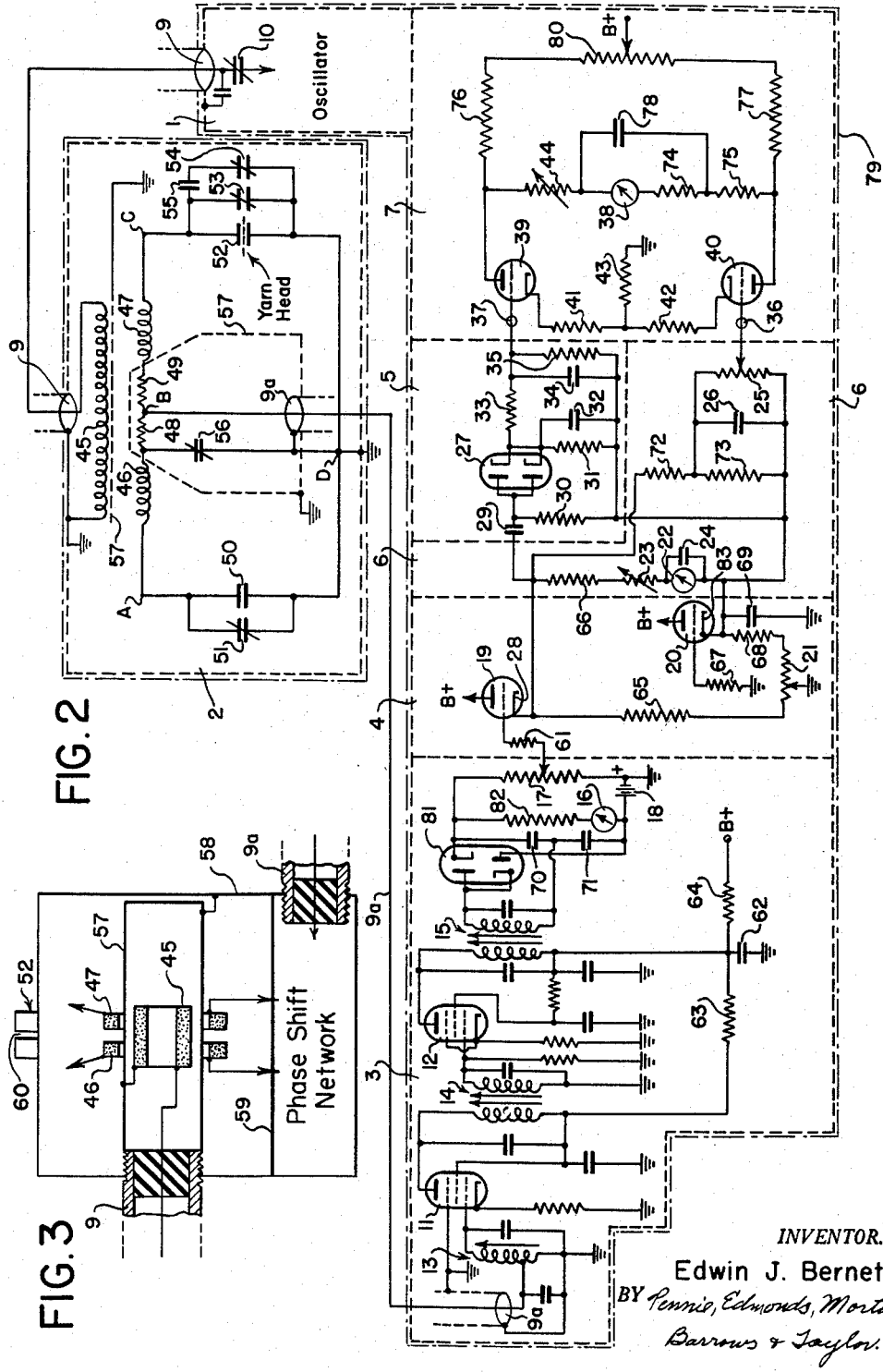

United States Patent Office 2,923,881
Patented Feb. 2, 1960

2,923,881

PORTABLE UNIFORMITY METER

Edwin J. Bernet, Charlottesville, Va., assignor to Institute of Textile Technology, Charlottesville, Va., a corporation of Virginia Application March 12, 1958, Serial No. 720,849

15 Claims. (Cl. 324—61)

This invention relates to the detection and measurement of variations in the characteristics of material of continuous length. It is especially adapted to measuring the uniformity of textile materials such as yarn, roving, sliver, picker lap, and the like, directly at the machines which make them.

Apparatus for automatically evaluating uniformity, or non-uniformity, of such materials is described in U.S. Letters Patent 2,774,940, granted December 18, 1956, but that apparatus is not adapted to transportation throughout the mill, nor is it suited to the substantially instantaneous and continuous measurement of departures from the average uniformity of yarn, for example, directly at the spindle frames during spinning.

In the case of yarn, it appears that a high percentage, for example, about 90%, of poor or off-standard spinning is caused by a disproportionately small percentage, for example about 10%, of the spindles. If such spindles can be quickly located, the fault can be promptly corrected, with considerable improvement in economy as well as in the product. No such apparatus suitable for measurement of departures from average uniformity has heretofore been known.

The apparatus according to the present invention is not only portable and adapted to measure and indicate departures from average uniformity of the product at the machine, but is capable of providing substantially the same degree of sensitivity to small differences in uniformity over a large range of mean values. In other words, as applied to the spinning of cotton (or other fibers), my apparatus provides substantially the same sensitivity to small differences in yarn uniformity over a wide range of count. "Count" is a measure of the length per unit of weight and therefore of the thickness; the higher the count, the less the thickness. Furthermore, any desired degree of precision can be selected over a large range.

Briefly, in accordance with the preferred embodiment of this invention, two signal components are derived in respect to an arbitrary "sensitive length" of the material under measurement; one signal component representing the preselected mean and the other representing the range which includes the deviation from the mean, and these two signals are impressed on a balanced vacuum tube voltmeter circuit such that the mean signal voltage is subtracted from the range signal voltage, and the difference voltage is impressed on the meter, with the result that the deflection indicates only departures with respect to the mean, viz., non-uniformity of the measured material. The "sensitive length" is not a discrete segment but is an effective length under which the material may be considered to be moving, because it is measured by the product of the speed of the material and the time-constant of a peak rectifier circuit.

The invention in its several aspects will be better understood by reference to the following description considered in connection with the accompanying drawings, in which:

Fig. 2 is a schematic circuit diagram of the apparatus represented in Fig. 1; and Fig. 3 illustrates certain structural features of the bridge box and measuring head of the invention.

Figure 1:
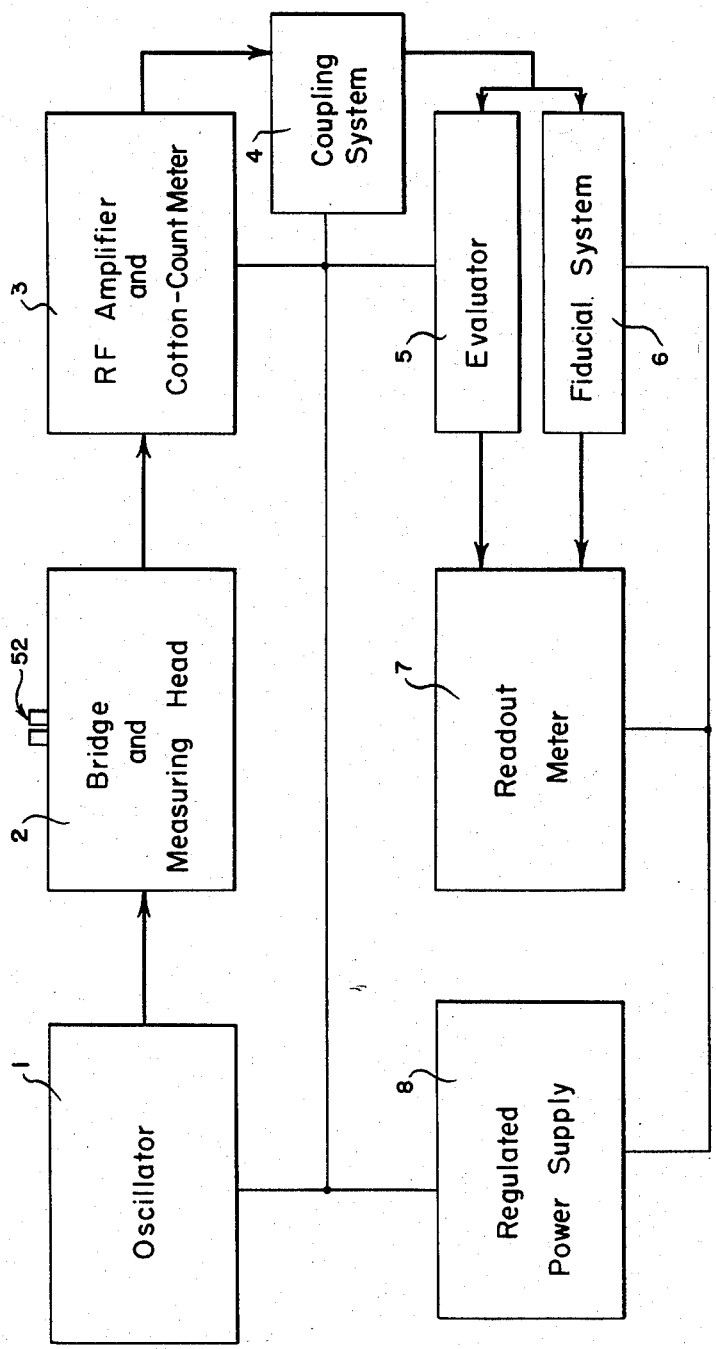
Fig. 1 is a block diagram representing a uniformity meter system comprising the invention.

The system in accordance with this invention is represented in the block diagram, Fig. 1, which, in the order shown, comprises an oscillator 1 connected to energize the bridge 2 which includes a measuring head. A radio-frequency amplifier 3 amplifies the output signals from the bridge, and a coupling system 4 of novel type couples the amplified signals simultaneously to an evaluator circuit 5 and to a fiducial system 6. The signal components from the evaluator and from the fiducial system respectively are impressed on readout meter circuit 7 which indicates the degree of uniformity, or non-uniformity, of the material under measurement. All of the apparatus as above outlined is furnished with suitable electric power at appropriate voltages in well known manner by regulated power supply 8. In view of the fact that regulated power supplies and oscillators such as are here contemplated, are well known in the art, neither is herein described in detail.

BRIEF DESCRIPTION OF OPERATION

The operation of the various components of the apparatus above mentioned is briefly, as follows: The material to be measured (presently assumed to be cotton yarn) is run through a measuring head which fundamentally is an electrostatic condenser. The yarn passes through the slit between the two fixed condenser plates. Variations in thickness of the yarn vary the capacity of this condenser which forms part of one arm of the balanced impedance bridge 2 which is energized by oscillator 1 having a closely regulated radio-frequency output, at, for example, 1500 kc. The output voltage of the bridge is a function of the bridge unbalance, and this output voltage is amplified by radio-frequency amplifier 3 and detected in a "cotton-count" meter circuit which, for convenience, is shown as included with the amplifier.

The output voltage of the cotton-count meter circuit comprises the uniformity signal which represents all of the thickness variations in the yarn, and from this fluctuating signal it is desired to derive the "mean" component and the "range" component. Ideally, the "mean" of the yarn would be the cotton-count of uniform thickness. Actually, this thickness varies more and less than the ideal; and the "mean" is an arbitrary average value established by the industry. The "range" is a measure of the thickness or weight variation about the mean and therefore is a measure of the fidelity or accuracy of the standardized spinning process at any given spindle. Hence, to achieve the object of the present invention, the apparatus must respond simultaneously to both the mean component and the range component of the uniformity signal, and automatically indicate the relative difference between the two components, regardless of the magnitude of the mean. The apparatus coupled to the output of the cotton count meter does this.

The output voltage of the cotton count meter, which comprises the uniformity signal, is coupled to evaluator circuit 5 and fiducial circuit 6 through coupling system 4. The evaluator separates out the range component of the uniformity signal from the mean component which is fed to the fiducial circuit.

The range signal is integrated with respect to a definite time constant to predetermine the above-mentioned sensitive length of material, and the mean signal is averaged and controlled in magnitude to balance a corresponding instantaneous magnitude of the range signal. These two signals are then combined in the readout meter circuit 7 so as to cancel each other such that only the range component in excess or in deficiency of the mean is indicated on the meter. High precision is achieved by thus balancing out with the mean signal an equal part of the range signal because this allows a greater deflection of the meter for a small difference in average yarn variation.

DESCRIPTION OF CIRCUIT

In the circuit diagram, Fig. 2, the apparatus and circuit elements are shown within enclosures which correspond to the enclosures shown as blocks in Fig. 1 where they are designated by the same reference characters.

Oscillator 1, of the crystal-controlled type operating at 1500 kc., is coupled through an adjustable condenser 10 and flexible coaxial cable 9 to bridge 2. This bridge of itself involves several novel features especially adapted for the present purpose, but it is also useful in other applications where a bridge of the nature herein described would be desirable. It is described below in detail.

The output signal from the bridge (here assumed to be of 1500 kc.) is fed through flexible coaxial cable 9a to the input of radio-frequency amplifier 3. This amplifier is, in general, of type well known in the art and comprises two amplifying tubes such as type 6AU6, transformer-coupled to a detector 48, of the voltage doubling type, which is part of the cotton count meter later to be described. The mentioned amplifier tubes are of the sharp cut-off variety, a characteristic here desirable. It is important that the two amplifier stages 11 and 12 be designed to minimize regeneration because in the entire system good stability and linearity (preferably within 1%) are required. The radio-frequency coupling transformers 13, 14 and 15 are conveniently of the type employed commercially as intermediate-frequency transformers in double-detection systems. This is one reason for the selection of 1500 kc. as the operating frequency; another reason being that by the use of a frequency of this magnitude regeneration is more readily minimized. To improve stability it is desirable to introduce some degeneration, as is well known in the art. By adopting precautions of this nature, operating frequencies within the range of from 100 kc. to as high as 5 megacycles may be employed. I have found that the bridge herein described will operate satisfactorily over a comparable frequency range.

The cotton count meter, which includes diode detector 81, is employed in connection with the initial balancing of the bridge and also to check the balance during operation. Its purpose is further described in connection with the description of the adjustment of the apparatus. Diode 81, which may be of type 6AL5, is a double diode connected in a voltage-doubling circuit which includes the cotton count indicating meter 16 in series with load resistance 82. Potentiometer 17 and biasing battery 18 in series are connected in shunt to the elements 16, 82. If a battery is used, one of the mercury type is preferred, although any other reliable source of biasing potential could be substituted. The manner in which the cotton count meter operates is described below. The detector is designed for high-potential operation. For example, 250 volts, or more, maximum scale may be used. By employing high output voltage, the need for a D.C. amplifier, with its many disadvantages, is obviated. It has been found that the heater supply to this 6AL5 tube, as well as to the other diodes later mentioned, should be regulated.

The meter 16 itself is a 0-50 microammeter of which the nominal resistance is 1500 ohms. For the purpose herein described, it is fitted with a special scale which reads in nominal hanks per pound, and is calibrated at 60% relative humidity. Assuming that this apparatus is to be used in connection with cotton yarn, the bridge would become further off-balance as the cotton count decreased, so the meter scale might read from 150 cotton count at the left (near normal 0) to 8, for example, at maximum deflection. Just above the normal zero mark on the scale a "Balance" mark is added at the point of lowest reading obtainable with the bridge in operation. This slight departure from actual zero results from the "contact potential" of the diodes, plus slightly less than approximately 0.1 volt which, in the embodiment here illustrated, comprises the voltage output of the bridge at its best balance point. This calibration mark provides a ready means for checking the balance adjustment at any time.

At a deflection point of the cotton count meter slightly above the "Balance" mark, it is advisable to add an additional mark such as "Set," to represent the adjustment of the bridge at which it is sufficiently off-balance to assure that the operator will not adjust the bridge to the opposite or decreasing-capacity side of the absolute null point. By thus employing this arbitrary-zero "Set" point the diodes will operate over the linear portions of their characteristic curves which is of equal importance. The biasing battery 18 above referred to, is employed to offset the effect of the mentioned diode contact potential as well as the deliberate off-balance setting of the bridge at its arbitrary "Set" point. In the mentioned embodiment a battery of 2.68 volts is used.

Potentiometer 17 is employed as a master gain control, and the voltage to which it is adjusted, which here comprises the entire "uniformity signal," is impressed on triode 19 which is connected as a cathode follower forming part of coupling system 4. The signal output of this cathode follower is fed to the inputs of evaluator 5 and of the fiducial system 6. Coupling system 4 functions also as an impedance-changing circuit which is required in order to transfer the signal voltage efficiently. The operation of this coupling system can best be explained with reference to the nature of the signal.

At the grid of cathode follower 19 the signal comprises the D.C. "mean" portion and also the peak amplitude or "range" portion which fluctuates about it; and it is important that the ratio of the range to the mean be unaltered by the circuitry. However, since it is a characteristic of cathode followers to draw plate current, even at zero input, such plate current causes a voltage drop across cathode resistor 65. Cathode 28 of tube 19 is therefore at a positive D.C. voltage with respect to ground even with no signal input to its grid. Consequently, with a uniformity signal on the grid of tube 19 there are three voltage components on cathode 28, viz., the mentioned mean and range portions and the normal D.C. bias which adds to the mean portion. Unless this bias voltage is removed or balanced out it will change the ratio of range to mean and to that extent destroy the accuracy of the measurement.

Further in accordance with my invention, this D.C. bias voltage, which at all times appears across resistor 65, is balanced out by balancing the output of cathode follower 19 against a "dummy" cathode follower 20 which is identical to cathode follower 19 in all respects except that no signal is impressed on its grid. Hence, the D.C. voltage across cathode resistor 68 is very closely the same as that across resistor 65 in the absence of a signal. The two cathodes 28 and 83 are brought to precisely the same voltage with respect to ground by adjustment of potentiometer 21 to a setting at which the fiducial meter 22 indicates zero, when no uniformity signal is impressed on tube 19. Thus, although the voltage at the cathode of tube 19 with respect to ground consists of the three voltage components above mentioned, the voltage at that cathode with respect to the cathode of tube 20 consists of only the mean and range components, so that the ratio of range to mean is maintained inviolate.

From the circuit diagram it will be seen that the cathode 83 of dummy cathode follower 20 comprises the common return for the inputs of both the fiducial system 6 and the evaluator 5, because the lower side of the fiducial meter 22 and the lower end of resistor 30 are connected to that cathode. Although this cathode is not at true zero D.C. ground potential, it is at a small fixed positive D.C. voltage (approximately 10 volts), and can be considered as a signal ground with respect to the uniformity signal. By thus deriving this bias or balancing voltage from a tube which is a duplicate of the cathode follower 19, the potential difference between the two cathodes will remain at substantially zero as the tubes age and, furthermore, tube 20 acts as an automatic balancer for small changes in the B+ supply voltage.

The indicating meter 22 incorporated in the fiducial system is a microammeter of the same type as meter 16. Here, however, the scale is preferably linear and may be marked from 0 to 150, for example, with the "fiducial point" marked at 100. This meter, therefore, indicates whether the yarn being tested is running in accordance with the mean value to which the instrument has previously been adjusted. Since this value is based on the cotton count, this fiducial meter will instantly indicate any extreme departures from cotton count, which sometimes occur. Such off-count yarn is usually the result of inadvertent use of the wrong roving bobbin, which should be corrected at once.

In series with the fiducial meter 22, a resistor 23 is adjustable to set the sensitivity of the fiducial meter. This need be adjusted only with change of tubes or the like. Condenser 24 in shunt to the actuating coil of meter 22, constitutes a filter having a long time constant, for example of the order of 10 seconds, to provide proper averaging of the mean signal, and to permit the master gain control 17 to be adjusted to a point which will deflect the fiducial meter 22 to the mentioned fiducial point so as to standardize the uniformity signal amplitude.

The output of the fiducial meter includes a potentiometer 25 shunted by condenser 26 which together comprise a filter circuit having a time constant (in this instance of approximately 3 seconds) which in cooperation with that of filter 22, 24 averages out substantially all of the range signal in the fiducial meter circuit. The slider on zeroing control potentiometer 25 is connected to one input terminal 36 of the readout meter 7 described below.

The evaluator 5 includes a diode 27 to which are connected the necessary coupling and filter elements. This diode is conveniently of the previously mentioned type 6AL5, and of which the electrodes are connected in parallel, as shown. As can be seen from the drawing, the input of the evaluator receives its signal from the cathode 28 of cathode follower tube 19. This input circuit includes condenser 29 and resistor 30. Condenser 29 serves to separate the range portion of the signal from the mean portion of the signal, and passes only the range portion of the signal on to evaluator 5. Resistor 30 and condenser 29 together comprise the coupling circuit and have a time constant, in this example of approximately 4 seconds, so as to pass all the components of the range signal which can be utilized by the peak-riding diode circuit of the evaluator. Diode 27 is connected as a peak rectifier because it is desired to "ride" the peak voltage representing the range signal. Consequently the values of the filter elements connected thereto are important although not critical. Resistor 31 and condenser 32, connected to the cathode side of rectifier 27, provide a time constant of slightly less than 3 seconds which determines the sensitive length of the range signal representing the moving yarn. It may also be mentioned that, if desired, the minimum "peaks" representing the thin places in the yarn can be measured by suitably polarizing the rectifier, as described in the above-mentioned patent.

The significance of the sensitive length of yarn, or other material being measured, has been mentioned above, but it may be noted that in this case the sensitive length is somewhat shorter than is customary in previous yarn uniformity measuring equipment because this apparatus is intended especially for portable use at the spinning frame where the yarn is delivered comparatively slowly. Hence, in order to obtain significant sampling data in respect to the operation at the spindle a short sensitive length is desirable.

The range signal data in respect to the sensitive length just mentioned, is further smoothed out by the subsequent filter elements comprising resistor 33, condenser 34 and resistor 35. To achieve its purpose this filter should have a comparatively long time constant—for example, one minute. The output from this filter is, as shown, connected to the other input terminal, 37, of the readout meter circuit.

The readout meter is basically a vacuum tube voltmeter of the double tube or push-pull type, but it is here employed in a novel manner. The indicating meter 38 comprises a 0–50 microammeter of nominal resistance approximately 1200 ohms. The dial carries a zero-center scale having 50 linear units on each side. This instrument is connected to the respective anodes of the triodes 39 and 40 of which the cathodes are symmetrically connected to ground through resistors 41, 42 and 43. Type 5814 tubes are suitable for the purpose. Variable resistor 44 is, like resistor 23, a sensitivity control, and may be of the same type since it is ordinarily adjusted only after tube replacement. Potentiometer 80 is employed as a zero adjustment for the readout meter 38. Since the slider of this potentiometer is connected to the anode potential source, adjustment thereof can be used to bring the indicating needle of meter 38 to zero position. This adjustment is made with the master gain control 17 at zero.

Since one of the objects of this invention is to measure the uniformity of yarn, or the like, at the machine which makes it, it is desirable that the final indicating instrument, viz., the readout meter, be suited to instantaneous reading. It is, therefore, preferred that in addition to the dial calibration above mentioned, the dial also be subdivided into three different color zones, indicating uniformities of "Better Than Average," "Average" and "Poorer Than Average." Thus, for example, if the needle remains within the central or Average zone, the yarn running through the pickup head is known to be satisfactory and the spinning operation to be normal. If the needle moves to the left, into the Better Than Average zone, this spinning position is producing better than average yarn. On the other hand, if the needle moves to the right, into the Poorer Than Average zone, this spinning position is producing yarn of greater than average non-uniformity, and the cause of the poor spinning should immediately be investigated.

The above-mentioned indications of this readout meter are the result of the following operation: The signal impressed upon terminal 37 comprises only the range component of the uniformity signal, and the polarity of the circuit is so arranged that introduction of the range signal causes the meter to advance from zero center to the right. The signal impressed on input terminal 36 represents only the mean component of the uniformity signal. It is controlled in amplitude by zeroing control 25, and the polarity of the circuit is so arranged that the mean signal causes deflection of the meter toward the left from center zero. Thus, when the readout meter is deflected to the right by a range signal, and the zeroing control 25 has been adjusted (advanced) so as to bring the readout meter back to zero center, that part of the mean component of the uniformity signal which equals the range component of the same uniformity signal has been balanced out. The deflection of the meter 38 will therefore be a measure of the non-uniformity based upon the mean yarn weight for which the instrument is then standardized. Accordingly, it is possible to calibrate the dial of the zeroing control 25 directly in units representing percentage non-uniformity, provided only that in so using it the input signal has been standardized by proper setting of the master gain control 17. The operation of the readout meter above described provides a type of measurement which has heretofore been unattainable.

The great flexibility of the apparatus according to this invention, especially in respect to its precision, can best be described by way of example. If the range signal is advanced by means of the master gain control, deflection of the readout meter 38 will be greatly increased. For instance, the amplitude of this signal may actually represent several times full scale deflection. This large signal is then balanced out by introducing an equal amount of mean signal by adjustment of the zeroing control 25, with the result that the readout meter will indicate very small differences in percentage non-uniformity. In this manner the readout meter can be preadjusted so that full scale deflection in either direction from zero represents, for example, only a 10% change in percentage non-uniformity. Thus it is possible by use of this invention for the first time to take full advantage of a highly sensitive vacuum tube voltmeter which heretofore was not adapted to such purpose. In other words, the readout meter can be set so that full scale deflection represents almost any desired percentage difference between the two input voltages.

BRIDGE AND MEASURING HEAD

Apparatus for the purpose herein described must include a signal-initiating section which is sensitive to extremely small variations in the uniformity of yarn, or the like, stable over extended periods of operation, free from external electrical influences, physically rugged, and of physical dimensions to permit its use directly on the machine at which the measured product is made. The bridge arrangement in accordance with this invention satisfactorily meets all of these requirements as the result of several novel features which will be evident from the following description.

The bridge in accordance with the invention is represented in the schematic circuit diagram within the dotted enclosure 2 of Fig. 2, certain structural features being illustrated in Fig. 3.

Electrically the bridge is of the hybrid type in which two adjacent arms together comprise the secondary of an input transformer. This input or primary winding 45 is of "Universal" winding in cylindrical form (as are the secondary coils) and is physically proportioned and arranged to be very closely coupled to the secondary coils 46, 47. Substantially unity coupling is preferred. Their arrangement is illustrated in Fig. 3. The secondary coils are wound identically in opposite directions and their inside ends are connected, as shown, respectively to resistors 48 and 49. These resistors are of the wire-wound type and of 10 ohms each. The primary coil in the illustrated example, is wound on a ¼" diameter form, making a coil approximately ½" in diameter and ½" long. The two secondary coils which constitute the two ratio arms, are wound on the same coil form ¾" in diameter. Each winding has a thickness and width of approximately ⅛" and the coils are spaced ⅛" apart.

In this bridge arrangement it is important that all of the mutual inductances be equal. By winding the secondary coils in opposite directions and connecting the inside turn of each through its respective resistance to the point B of the bridge, the outside ends of the secondary coils at points A and C will be at opposite phase and both coils will be symmetrically balanced to ground. This symmetry in the bridge in combination with the nearly unity coupling between the primary and secondary windings are contributing factors in providing the unique operation of this bridge. The secondary coils 46 and 47 have a "Q" of the order of 100 but, since they are very closely coupled to the primary, the resonance characteristic of the bridge is comparatively broad. Consequently, no measurable change in sensitivity has been observed over the range of capacity variations required of the measuring head 52.

The A—D arm of the bridge is capacitive and comprises the fixed condenser 50 shunted by an adjustable condenser 51. Condenser 50 as employed in this embodiment is of the glass dielectric type having a value of 15 mmf. and condenser 51 is of quartz dielectric type adjusted by an Invar plunger. It is rated at between 1.0 and 20 mmf.

The fourth arm of the bridge is also capacitive, and includes as one element the measuring head 52. To supplement the very small capacity of the measuring head, a capacitive network is preferably connected in parallel thereto. This network comprises condensers 53, 54 and 55, of which condensers 53 and 54 are of the same type as condenser 51, but are of different capacity range. In this case, condenser 53 is of 1–10 mmf. and condenser 54 of 0.5–5 mmf. Fixed condenser 55 is of 1.0 mmf.

The inclusion of the measuring head 52 in the C—D bridge arm inherently increases the power factor of this arm more than would a high grade quartz dielectric condenser of the type employed elsewhere in the bridge. Therefore, to stabilize the bridge and maintain it at an accurate balance point it is necessary to provide a resistive balance, by phase shift, in addition to the capacitive balance. Instead of achieving this by the introduction of a balancing resistance, I have found it possible to employ for this purpose an adjustable condenser 56 also of the same quartz-dielectric type, and having a capacity of 3–30 mmf. This arrangement introduces several novel advantages, i.e., it avoids the use of an extremely high, variable resistance which would introduce contact difficulties and cannot be as readily adjusted to a precise value as can an adjustable condenser of the type here employed. Also, difficulties due to coupling effects which would be introduced by the adjustable high-value resistor itself are avoided, and the symmetry of the circuit as a whole is not affected. Additionally, the arrangement permits one side of all of the condensers in the capacitive arms to be grounded, as is one side of the "R-balance" condenser 56. This assures good stability at all adjustments in spite of the fact that the actual capacity variation of the measuring head 52 when in operation requires the bridge to be sensitive to capacity changes of the order of only .001 mmf.

Coil 46 and parallel-connected condensers 50, 51 in series with the coil are resonant to the oscillator frequency of 1500 kc., and the same is true of coil 47 with the condenser network 52, 53, 54, 55 in series. Such resonance increases the sensitivity as much as ten times, and this is possible because of the stability and reliability of the bridge system as a whole. However, it is not essential that a resonant bridge be employed if an equivalent increase in signal is obtained in some other manner, as by increasing the energizing voltage from the oscillator, or increasing the gain in the amplifier 3. Also, the bridge need not be operated at radio frequency because it is equally operable at low frequencies, for some applications.

In order to assure stability and reliability of operation, certain shielding precautions are necessary as represented in both Figs. 2 and 3. As might be expected, all of the bridge elements, except the measuring head, are enclosed in an aluminum or copper shielding box 58. A cylinder 57 of rigid metal such as brass, grounded to the bridge box, is shown interposed between the primary and secondary coils. A longitudinal slit is cut in the cylinder to prevent the cylinder from constituting a shorted turn in the transformer. This cylinder spans the entire distance between the side walls of the bridge box except for a spacing of about 1/32" at each side wall to prevent the metal walls from shortcircuiting the slit in the cylinder.

An aluminum or copper partition wall 59 near the bottom of the bridge box 58 forms a shielded compartment in which are located the power-factor-adjusting or phase-shift network elements comprising resistors 48 and 49 and condenser 56. The other bridge elements, except for the measuring head, are located in the compartment above partition wall 59. This separation of the resistance-balancing elements and capacitance-balancing elements minimizes interaction between these two sections of the bridge and thus permits a bridge balance to be attained usually by adjusting the capacitance balance and then the resistance balance only once, instead of the more usual repetition of such adjustments required in other bridge systems. This freedom from interaction appears also to be due in part to the fact that the resistance elements are fixed.

As shown in Fig. 3, the measuring head itself is attached to the top of the bridge box. It comprises two rigid insulated metal plates about ½" long, separated by a slit 60 through which the yarn passes. Measuring heads of other construction adapted to measuring other forms of material are well known in the art and may be substituted for the head 52.

When used on a spinning frame as above suggested, the bridge box 58 is clamped onto the thread board so that the measuring head engages the yarn between the front rolls and the thread board pig-tail. Since the overall dimensions of this box need be no more than approximately 3½ inches long and 2 inches in the other two dimensions it can readily be placed there. The remaining apparatus herein described can conveniently be enclosed in a shielded cabinet 79 mounted on wheels so that the entire assembly is readily transportable between spinning frames in the mill. In Fig. 2 this enclosure is designated by a dot-dash line. It has been found in practice that the flexible coaxial cables 9 and 9a which connect the bridge box to the associated apparatus in the cabinet can be flexed as much as required without noticeably affecting the output signal from the bridge.

ADJUSTMENT OF THE APPARATUS

Before the equipment is stationed at a given measuring position, the instrument is adjusted as follows: With the master gain control 17 at zero, the bridge is first balanced by reference to the cotton count meter 16. This is done by adjusting condenser 54 for the lowest reading on the meter and then adjusting condenser 56 for the lowest reading. Normally these adjustments are not interdependent. If, in adjusting condenser 54, the meter needle comes down to the "Balance" point previously referred to, it is not necessary to adjust condenser 56 further. At the null point of the bridge, the circulating current A—B—D—A is equal and opposite to the circulating current C—D—B—C.

The bridge having thus been balanced, the capacity of condenser 54 is increased until the needle of the cotton count meter registers at the "Set" point above mentioned. With the master gain control still at zero, the readout meter 38 is then adjusted to its center zero position by potentiometer 45. Next the fiducial meter 22 is set to zero by adjustment of potentiometer 21. In practice this adjustment needs repeating only occasionally.

The apparatus is now ready to be adjusted in connection with the yarn to be measured. Therefore, the bridge box is clamped onto the thread board of a spinning frame so that the yarn runs through the slit 60 in the measuring head. The master gain control 17 and the zeroing control 25 are next advanced to predetermined positions, below described, and as the yarn runs through the head, the readout meter is observed for a short period to ascertain that it has stabilized itself. The time constant of its circuit (about 2 minutes) is determined by its own resistance, that of resistor 74 and condenser 78. Then, with the yarn still running through the measuring head, the actual measurement is made by observing the readout meter for 1 or 2 minutes to ascertain the quality of the yarn being spun. This is indicated by the zone on the meter dial, as previously explained.

The above-mentioned "predetermined positions" of the master gain and zeroing controls are ascertained by preliminary tests for a given set of spinning frames. These dial positions are not changed unless the instrument is moved to a different type of spinning or material production. Assuming that the bridge has been balanced and the zeros checked as above described and with the yarn running through the measuring head, the master gain control 17 is advanced until the fiducial meter 22 registers at the Fiducial point. This adjustment standardizes the magnitude of the signal fed into the evaluator 5 and, with this setting, the readout meter 38 will move toward the right from zero center. Next, the zeroing control 25 is advanced until the readout meter returns to center zero. From the previous descriptions it will be recalled that this adjustment of the readout meter to zero signifies that the mean signal voltage has balanced out an equal magnitude of the range signal voltage, because the two are introduced in the readout meter circuit in opposite polarity. The above procedure for predetermining the positions of the master gain and zeroing controls should be repeated on several spindles running similar yarn until averaged settings for both controls have been obtained.

VALUES OF CIRCUIT ELEMENTS

To facilitate the construction and operation of apparatus comprising this invention, the values of unobvious circuit elements not already stated, are given below by way of example. Optional choice of other elements or elements of values other than those herein indicated may require changes in related elements or components, as is well understood.

Resistors

| | |
|---|---|
| 35 | 10 megohms |
| 17 | 5 do |
| 25 | 3 do |
| 31, 72, 73 | 2.7 do |
| 33 | 1.8 do |
| 82, 61, 67 | 1 do |
| 30 | .82 do |
| 66 | 470K |
| 75 | 75K |
| 23, 43, 44 | 50K |
| 76, 77 | 39K |
| 74 | 33K |
| 63 | 15K |
| 80 | 10K |
| 41, 42 | 4.7K |
| 64 | 2.2K |
| 65, 68 | 1.0K |
| 21 | 50 ohms |

Condensers

| | |
|---|---|
| 24 | 100 mf |
| 78 | 50 mf |
| 62, 69 | 10 mf |
| 29 | 4 mf |
| 26, 32 | 1 mf |

It is intended that the invention herein described be limited not by the above-described embodiments, but only by the scope of the appended claims.

I claim:

1. In a system adapted automatically to measure departures from uniformity of an electric signal subject to random amplitude variations and random frequency of occurrence, detector means for producing from said variations a uniformity signal voltage, means for rectifying the voltage peaks of said uniformity signal in respect to a preselected time period to produce a range signal voltage, means for averaging the range signal voltage, fiducial means including averaging means for producing from said uniformity signal an average mean signal voltage representative of an arbitrary limited range of variations of said uniformity signal, means for adjusting the amplitude of said mean signal voltage, a readout meter circuit including an indicating device, means for impressing said averaged range signal and mean signal voltages on said readout meter circuit, and means in said readout meter circuit for combining said signal voltages respectively impressed thereon in opposite polarity, such that said indicating device responds only to the effective difference between said impressed signal voltages.

2. A system adapted automatically and continuously to measure the uniformity of an electric signal having random frequency of occurrence and random variations of amplitude with respect to a predetermined mean value, which comprises means for amplifying said signal, means for detecting the amplified signal to produce signal voltage representative of said random variations, an evaluator circuit including a peak rectifier having a time-constant circuit proportioned to predetermine the peak rectification period whereby to develop a range signal, a fiducial circuit, means coupling the output of the detecting means to said evaluator circuit and to said fiducial circuit, said fiducial circuit being adapted to develop a mean voltage representing a mean of the output voltage variations of said detector, a readout meter circuit having indicating means and first and second input terminals, means coupling the range signal output of said evaluator circuit to said first input terminal, means coupling the mean signal output of said fiducial circuit to said second input terminal, and means included in said readout meter circuit to balance said mean voltage against a corresponding voltage component of said range signal.

3. A system adapted automatically and continuously to measure the uniformity of an electric signal having random frequency of occurrence and random variations of amplitude with respect to a predetermined mean value, which comprises means for amplifying said signal, means for detecting the amplified signal to produce signal voltages representative of said random variations, an evaluator circuit including a peak rectifier having a time-constant circuit proportioned to predetermine the peak rectification period whereby to develop a range signal, a fiducial circuit, means coupling the output of the detecting means to said evaluator circuit and to said fiducial circuit, said fiducial circuit being adapted to develop a mean voltage representing a mean of the output voltage variations of said detector, a readout meter circuit having indicating means and first and second input terminals, means coupling the range signal output of said evaluator circuit to said first input terminal, means including voltage-adjusting means for coupling the mean signal output of said fiducial circuit to said second input terminal, and means included in said readout meter circuit to balance said mean voltage against a corresponding voltage component of said range signal such that said indicating means responds only to small differences of range signal amplitude with respect to any preselected one of a large range of mean voltage values.

4. Portable apparatus adapted to measure continuously an electric signal having fluctuations corresponding to variations in a characteristic per unit length of a product such as yarn and the like, directly at the machine which makes said product, said apparatus including an impedance bridge sensitive to changes in electrostatic capacity considerably less than 1 micro-microfarad, a first shielded casing enclosing said bridge, a measuring head comprising a pair of condenser-forming plates secured to the exterior of said casing and spaced apart by an air gap through which said material is adapted to run, means connecting said measuring head in one arm of said bridge, a second shielded casing enclosing: an oscillator having a radio-frequency output voltage of controlled, fixed amplitude and frequency, shielded cable connecting the output voltage of said oscillator to said bridge to energize the same such that characteristic variations in said material cause variations in the bridge output voltage of random amplitude and random frequency of occurrence, an amplifier operable at the oscillator frequency for amplifying voltage output from said bridge, detector means connected to the output of said amplifier and adapted to produce from the amplifier output voltage a uniformity signal voltage, means for rectifying the voltage peaks of said uniformity signal in respect to a preselected time period to produce a range signal, filter means for averaging the range signal voltage, a fiducial circuit including averaging means for producing from said uniformity signal an averaged mean signal voltage representative of an arbitrary limited range of variations of said uniformity signal, means for adjusting the amplitude of the mean signal voltage output from said fiducial circuit, a readout meter circuit including an indicating device, means for impressing said averaged range signal and mean signal voltages on said readout meter circuit, means in said readout meter circuit for combining said signal voltages respectively impressed thereon in opposite polarity such that said indicating device responds only to the effective difference between said impressed signal voltages, and shielded cable connecting the output voltage of said bridge to the input of said amplifier in said second casing.

5. In apparatus adapted automatically to measure departures in uniformity of yarn and the like: an impedance bridge of the hybrid type having a primary coil, a controlled-radio-frequency oscillator connected to energize said primary, two similar secondary coils closely and symmetrically coupled to said primary coil, first and second similar resistors serially connected between adjacent ends of said secondary coils, adjustable capacity including a first variable condenser connected between the other end of a first of said secondary coils and a common ground terminal, adjustable capacity including a second variable condenser connected between the other end of the second of said secondary coils and said ground terminal, said second variable condenser comprising a yarn measuring head including two condenser plates insulated from each other and separated by a slit adapted to accommodate yarn moving therethrough, and a phase-shift condenser connected between said ground terminal and the junction of said first secondary coil and said first resistor, said phase-shift condenser being adjustable to balance the phase shift introduced in the bridge by said measuring head, and the junction of said resistors and said ground terminal comprising respectively the output terminals of the bridge.

6. In portable apparatus adapted automatically to measure departures in uniformity of yarn and the like with respect to an arbitrary mean value: an impedance bridge of the hybrid type having a primary coil, a controlled-radio-frequency oscillator connected to energize said primary, two similar secondary coils closely and symmetrically coupled to said primary coil, first and second similar resistors serially connected between adjacent ends of said secondary coils, adjustable capacity including a first variable condenser connected between the other end of a first of said secondary coils and a common ground terminal, adjustable capacity including a second variable condenser connected between the other end of the second of said secondary coils and said ground terminal, said second variable condenser comprising a yarn measuring head including two condenser plates insulated from each other and separated by a slit adapted to accommodate yarn moving therethrough, and a phase-shift condenser connected between said ground terminal and the junction of said first secondary coil and said first resistor, said phase-shift condenser being adjustable to balance the phase shift introduced in the bridge by said measuring head, the junction of said resistors and said ground terminal comprising respectively the output terminals of the bridge, a radio-frequency amplifier of which the input is connected to said output terminals for amplifying random voltage variations comprising the output signal from said bridge, means for detecting the amplified signal to produce signal voltages representative of said random variations, an evaluator circuit including a peak rectifier having a time-constant circuit proportioned to predetermine the peak rectification period whereby to develop a range signal, a fiducial circuit, means coupling the output of the detecting means to said evaluator circuit and to said fiducial circuit, said fiducial circuit being adapted to develop a mean voltage representing a mean of the output voltage variations of said detector, a readout meter circuit having indicating means and first and second input terminals, means coupling the range signal output of said evaluator circuit to said first input terminal, means including voltage-adjusting means for coupling the mean signal output of said fiducial circuit to said second input terminal, and means included in said readout meter circuit adjustable to balance said mean voltage against a corresponding voltage component of said range signal such that said indicating means responds only to small differences of range signal amplitude with respect to any preselected one of a large range of mean voltage values.

7. An impedance bridge of the hybrid type including an input winding comprising a primary coil, two similar multi-layer secondary coils oppositely wound and closely and symmetrically coupled to said primary coil, two similar resistors serially connected between adjacent inside ends of said secondary coils, adjustable capacities connected between the other ends of said secondary windings and a common ground terminal, an output terminal at the junction of said resistors, said ground terminal comprising the other output terminal, and a power-factor-adjusting condenser connected between said ground terminal and the coterminal comprising the junction of one of said resistors and the adjacent secondary coil.

8. An impedance bridge of the hybrid type including an input winding comprising a primary coil, two similar secondary coils closely and symmetrically coupled to said primary coil, two similar resistors serially connected between adjacent ends of said secondary coils, adjustable capacities connected between the other ends of said secondary windings and a common ground terminal, an output terminal at the junction of said resistors, the other output terminal comprising said ground terminal, and a power-factor-adjusting condenser connected between said ground terminal and the coterminal comprising the junction of one of said resistors and the adjacent secondary coil.

9. An impedance bridge according to claim 8 in which the primary coil is adapted to be energized by a voltage at fixed frequency, and said secondary coils with the condensers respectively connected directly thereto are proportioned to be resonant at said frequency.

10. An impedance bridge of the hybrid type including an input winding comprising a cylindrical primary coil, two similar multilayer cylindrical secondary coils closely and symmetrically coupled to said primary coil, all three coils being coaxial, said secondary coils being oppositely wound and disposed with their inside ends adjacent, two similar fixed resistors serially connected between said inside ends of the secondary coils, at least one variable condenser connected between the outside end of each secondary coil and a common ground terminal, an output terminal at the junction of said resistors, the other output terminal comprising said ground terminal, and a power-factor-adjusting condenser connected from said ground terminal to the coterminal comprising the junction of one of said resistors and the inside end of the secondary coil connected thereto.

11. An impedance bridge according to claim 10 which is adapted to measure small capacity changes, one of said variable condensers being disposed in one arm of the bridge and comprising the capacity to be measured, said power-factor-adjusting condenser being connected at its ungrounded side to the secondary coil in the opposite arm.

12. An impedance bridge according to claim 11 in which said one arm of the bridge comprises a network including a first adjustable condenser connected in shunt to said capacity to be measured, and a second adjustable condenser and a fixed condenser connected in series with each other and in parallel to said fixed adjustable condenser.

13. An impedance bridge according to claim 10 adapted for portable use, in which said secondary coils are disposed outside of the primary coil, a cylindrical non-magnetic shield interposed between said primary and secondary coils, a shielding box enclosing the circuit elements comprising said bridge, a shielding wall within said box subdividing said box into two shielded compartments, said resistors and said power-factor-adjusting condenser alone of the circuit elements above recited comprising a phase-shift network and being disposed in one of said compartments, whereby said phase-shift network is isolated from the remaining elements of the bridge.

14. An impedance bridge according to claim 13 which is adapted to measure extremely small capacity changes, a certain one of said variable condensers being connected in a first arm of the bridge and comprising the capacity to be measured, said power-factor-adjusting condenser being connected at its ungrounded side to a terminal of the secondary coil in the opposite arm, said certain variable condenser comprising two stationary plates insulated from each other and disposed on the exterior of said shielding box, said plates having a slit therebetween adapted to accommodate material to be measured.

15. In apparatus adapted automatically to measure random departures in uniformity of a voltage with respect to an arbitrary mean value: comprising terminals at which random voltage variations are applied, a radio-frequency amplifier having an input connected to said terminals and adapted to amplify random voltage variations, means for detecting the amplified signal to produce signal voltages representative of said random variations, an evaluator circuit including a peak rectifier having a time-constant circuit proportioned to predetermine the peak rectification period whereby to develop a range signal, a fiducial circuit, means coupling the output of the detecting means to said evaluator circuit and to said fiducial circuit, said fiducial circuit being adapted to develop a mean voltage representing a mean of the output voltage variations of said detector, a readout meter circuit having indicating means and first and second input terminals, means coupling the range signal output of said evaluator circuit to said first input terminal, means including voltage-adjusting means for coupling the mean signal output of said fiducial circuit to said second input terminal, and means included in said readout meter circuit adjustable to balance said mean voltage against a corresponding voltage component of said range signal such that said indicating means responds only to small differences of range signal amplitude with respect to any preselected one of a large range of mean voltage values.

References Cited in the file of this patent

UNITED STATES PATENTS

| 1,717,400 | Nyquist | June 18, 1929 |
| 2,273,066 | Povey et al. | Feb. 17, 1942 |
| 2,576,772 | Bernet et al. | May 27, 1951 |
| 2,679,639 | Locher | May 25, 1954 |

FOREIGN PATENTS

| 772,049 | Great Britain | Apr. 10, 1957 |

OTHER REFERENCES

Electronic, "Cable Sheath Thickness," April 1954, pages 135–137.

Oatley et al.: "Bridges With Coupled Indictive Ratio Arms as Precision Instruments for the Comparison of Laboratory Standards of Resistance or Capacitance," Proc. of IEE, part III, Radio Eng. vol. 101, No. 70, March 1954, pages 91–100.